United States Patent
Kim et al.

(10) Patent No.: US 10,611,417 B2
(45) Date of Patent: Apr. 7, 2020

(54) REAR SPOILER APPARATUS FOR VEHICLE

(71) Applicants: Hyundai Motor Company, Seoul (KR); Kia Motors Corp., Seoul (KR)

(72) Inventors: Hak Lim Kim, Suwon-si (KR); Min Sik Chung, Seongnam-si (KR); Sang Hyun Park, Seoul (KR); Ui Chang Hwang, Hwaseong-si (KR); Seung Hwan Kim, Hwaseong-si (KR); Dong Guk Lee, Seoul (KR); Koo Cheol Kang, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 84 days.

(21) Appl. No.: 16/035,886

(22) Filed: Jul. 16, 2018

(65) Prior Publication Data
US 2019/0248430 A1   Aug. 15, 2019

(30) Foreign Application Priority Data
Feb. 13, 2018  (KR) .......................... 10-2018-0017960

(51) Int. Cl.
*B62D 35/00*       (2006.01)
*B62D 37/02*       (2006.01)

(52) U.S. Cl.
CPC ............ *B62D 35/007* (2013.01); *B62D 37/02* (2013.01)

(58) Field of Classification Search
CPC ..... B62D 35/002; B62D 35/007; B62D 37/07
USPC ........................................... 296/180.1–180.5
See application file for complete search history.

(56) References Cited

U.S. PATENT DOCUMENTS

| | | | | |
|---|---|---|---|---|
| 5,165,751 A | * | 11/1992 | Matsumoto .......... | B62D 35/007 296/180.5 |
| 7,431,382 B2 | * | 10/2008 | Vlahovic ............. | B62D 35/007 296/180.5 |
| 2007/0018482 A1 | * | 1/2007 | Tuohimaa ............ | B62D 33/04 296/180.1 |
| 2007/0228771 A1 | * | 10/2007 | Froeschle ............ | B62D 35/007 296/180.1 |
| 2007/0228772 A1 | * | 10/2007 | Froeschle ............ | B62D 35/007 296/180.1 |
| 2007/0228773 A1 | * | 10/2007 | Froeschle ............ | B62D 35/007 296/180.5 |
| 2007/0236044 A1 | * | 10/2007 | Froeschle ............ | B62D 35/007 296/180.5 |
| 2007/0236045 A1 | * | 10/2007 | Froeschle ............ | B62D 35/007 296/180.5 |
| 2007/0236046 A1 | * | 10/2007 | Froeschle ............ | B62D 35/007 296/180.5 |

(Continued)

FOREIGN PATENT DOCUMENTS

| | | | |
|---|---|---|---|
| DE | 102016118887 A1 * | 4/2018 | ............. B62D 37/02 |
| JP | 63265777 A * | 11/1988 | |

(Continued)

*Primary Examiner* — Hilary L Gutman
(74) *Attorney, Agent, or Firm* — Morgan, Lewis & Bockius LLP

(57) ABSTRACT

A rear spoiler apparatus for a vehicle may include a main flap which is deployed by an operation force from an actuator and a support flap which is additionally deployed from the main flap, in which the support flap rotates to open together when the main flap rotates and the open angle of the support flap is greater than the open angle of the support flap.

7 Claims, 9 Drawing Sheets

(56) References Cited

U.S. PATENT DOCUMENTS

| | | | | |
|---|---|---|---|---|
| 2008/0179914 A1* | 7/2008 | Wegener | ............... | B62D 35/007 296/180.1 |
| 2014/0346810 A1* | 11/2014 | Wild | .................... | B62D 35/007 296/180.5 |
| 2015/0232135 A1* | 8/2015 | Beierl | .................. | B62D 35/007 296/180.1 |
| 2016/0023693 A1* | 1/2016 | Wolf | ........................ | B60L 58/26 296/180.5 |
| 2017/0101136 A1 | 4/2017 | Zielinski et al. | | |

FOREIGN PATENT DOCUMENTS

| | | | | |
|---|---|---|---|---|
| JP | 01289773 | A | * | 11/1989 |
| JP | 02006281 | A | * | 1/1990 |
| JP | 03217379 | A | * | 9/1991 |
| JP | 03217380 | A | * | 9/1991 |
| KR | 10-1997-0005743 | A | | 2/1997 |
| KR | 10-2007-0001807 | A | | 1/2007 |
| KR | 10-2015-0072715 | A | | 6/2015 |

* cited by examiner

REAR SPOILER APPARATUS FOR VEHICLE

CROSS REFERENCE TO RELATED APPLICATION

The present application claims priority to Korean Patent Application No. 10-2018-0017960, filed Feb. 13, 2018, the entire contents of which is incorporated herein for all purposes by this reference.

BACKGROUND OF THE INVENTION

Field of the Invention

The present invention relates to a rear spoiler apparatus for a vehicle and, more particularly, to a rear spoiler apparatus for a vehicle, the apparatus having a main flap which is operated by an actuator and a support flap which is operated in combination with the main flap.

Description of Related Art

While a vehicle is driven, the vehicle body tends to be lifted with an increase in speed of the vehicle, and in the instant case, the grip of tires is reduced, so that the drivability deteriorates, and if severe, it causes an accident.

To prevent the present problem, a spoiler which is an attachment that presses down a vehicle body, using airflow when a vehicle is driven is mounted on vehicles. The spoiler is also called an air spoiler because it changes airflow.

Recently, a spoiler apparatus has an additional support flap that deploys in addition to a main flap that deploys to maximize reduce lift. In the structure of additionally deploying a support flap, the, there is a demand for an actuator for operating the main flap and an actuator for operating the support flap, so that the manufacturing cost, weight, and package are decreased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rear spoiler apparatus for a vehicle, the apparatus being compact by reducing the manufacturing cost and weight and simplifying the operation structure by improving the structure of a support flap deploying in addition to a main flap that deploys such that the support flap is operated in combination with the main flap.

In various aspects of the present invention, the, there is provided a rear spoiler apparatus for a vehicle, the rear spoiler apparatus including: an actuator fixed to a trunk lid; a main flap disposed such that a second end portion can rotate up and down about a first end portion hinged to the trunk lid, and operated by power from the actuator; and a support flap hinged to be configured to rotate about the main flap and rotating up and down when the main flap rotates.

The rear spoiler apparatus may further include: link mechanisms connected to the actuator, rotatably coupled to the trunk lid, and rotated by power from the actuator; and main flap operation mechanisms connecting the link mechanisms and the main flap to each other and rotating up and down the main flap using torque from the link mechanisms.

The rear spoiler apparatus may further include support flap operation mechanisms connected to the main flap, the support flap, and the trunk lid to rotate up and down the support flap using torque from the main flap.

The actuator may be one of a solenoid having a plunger reciprocating straight forwards and backwards and a motor.

The link mechanisms each may include: a connecting rod disposed through left and right sides of an end portion of the plunger; and a rotation rod having one end portion connected to the connecting rod and a second end portion connected to the main flap operation mechanism, having a rotation shaft disposed between the first end portion and the second end portion and fixed to the trunk lid, and rotating about the rotation shaft when the plunger is moved forwards and backwards thereof.

The main flap operation mechanisms each may include: a main guide bracket fixed to the trunk lid and having main guide holes extending forward and rearward thereof; a main lower shaft connected to an end portion of the rotation rod and moving forward and rearward in the main guide holes; a main upper shaft rotatably coupled to a first flange of the main flap; and a main rod connecting the main lower shaft and the main upper shaft to each other.

The support flap operation mechanisms each may include: a support bracket fixed to the trunk lid and having support guide holes extending forward and rearward thereof; a support lower shaft disposed to move forward and rearward in the support guide holes; a support upper shaft rotatably coupled to a second flange formed behind the first flange on the main flap; a support rod connecting the support lower shaft and the support upper shaft to each other; and an arc-shaped support hinge connecting the support upper shaft to the support flap.

When the support flap rotates with rotation of the main flap, an open angle of the support flap may be greater than an open angle of the main flap.

The main guide holes may be elongated horizontally forward and rearward thereof, and the support guide holes may be formed in an arc shape with a rear end portion higher than a front end portion and are positioned higher than the main guide holes.

The main flap and the support flap each may have a plurality of left and right partial sections with the actuator therebetween, and when the actuator is operated, the left and right sections of the main flap and the support flap may be simultaneously operated.

According to the rear spoiler apparatus for a vehicle of the present invention, the apparatus may include a main flap which is deployed by an operation force from an actuator and a support flap which is additionally deployed from the main flap, and the support flap rotates to open together when the main flap rotates. Accordingly, the, there is no demand for a separate power device (a motor, an actuator etc.) for operating the support flap in the apparatus of the present invention, so it is possible to reduce the manufacturing cost and weight and simplify the operation structure, so it is possible to make the apparatus compact.

According to the rear spoiler apparatus of the present invention, when the support flap rotates with rotation of the main flap, the open angle of the support flap is greater than the open angle of the main flap. Accordingly, it is possible to maximally reduce lift and secure maximum driving stability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
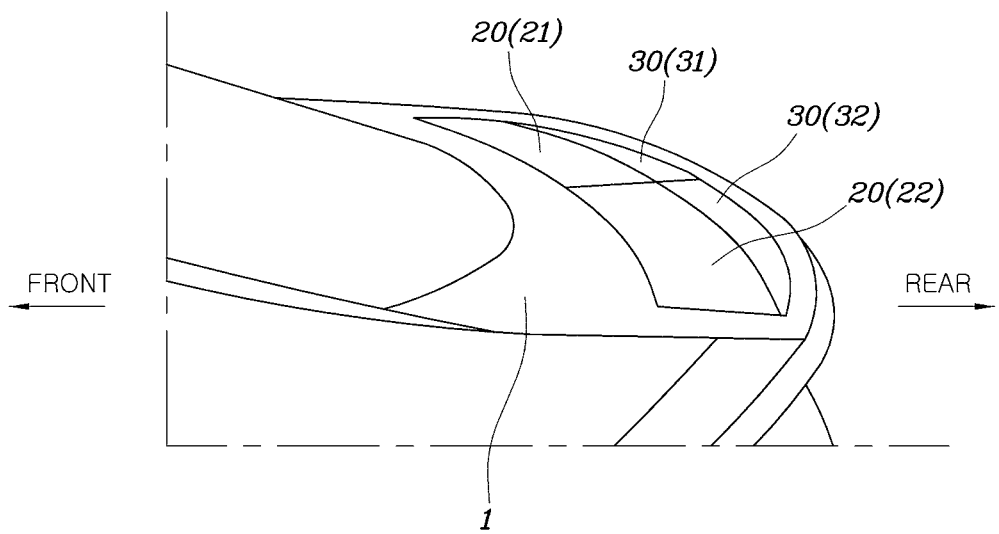
FIG. 1 is a perspective view showing a rear spoiler apparatus according to an exemplary embodiment of the present invention mounted on a trunk lid with a main flap and a support flap closed.
Figure 2:
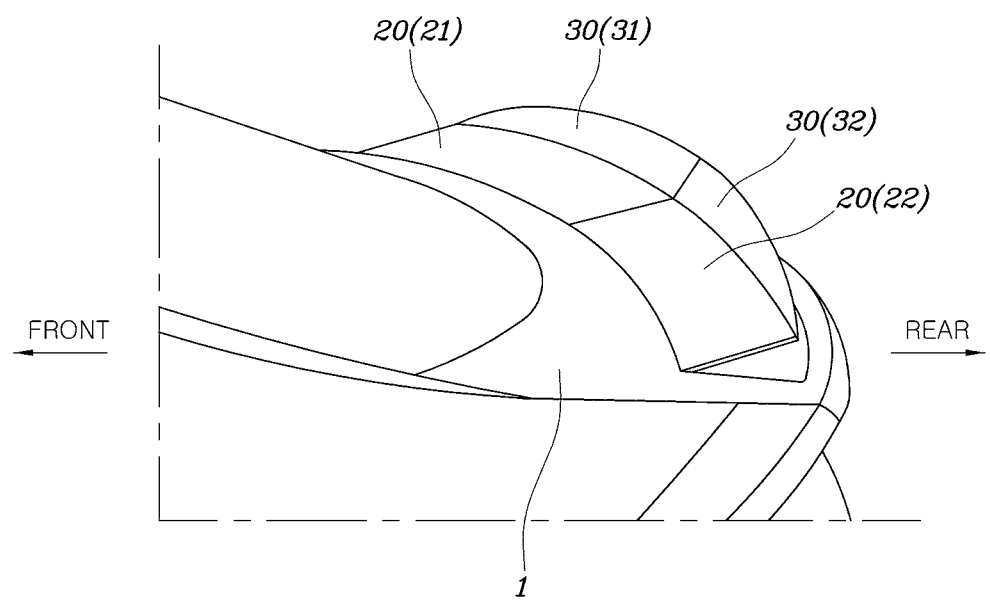
FIG. 2 is a view when the main flap and the support flap shown in FIG. 1 have been deployed.
Figure 3:
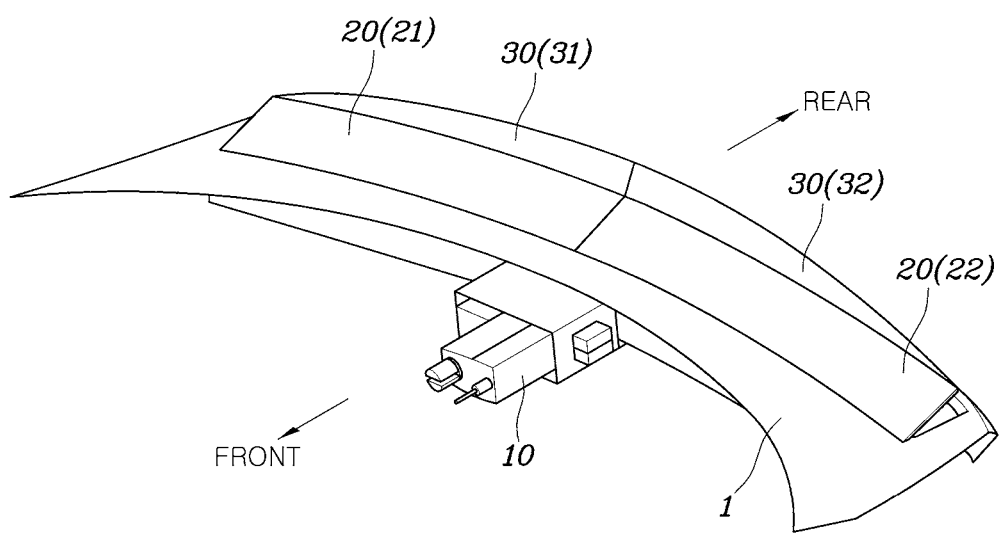
FIG. 3 is a perspective view for describing the state of FIG. 2.
Figure 4:
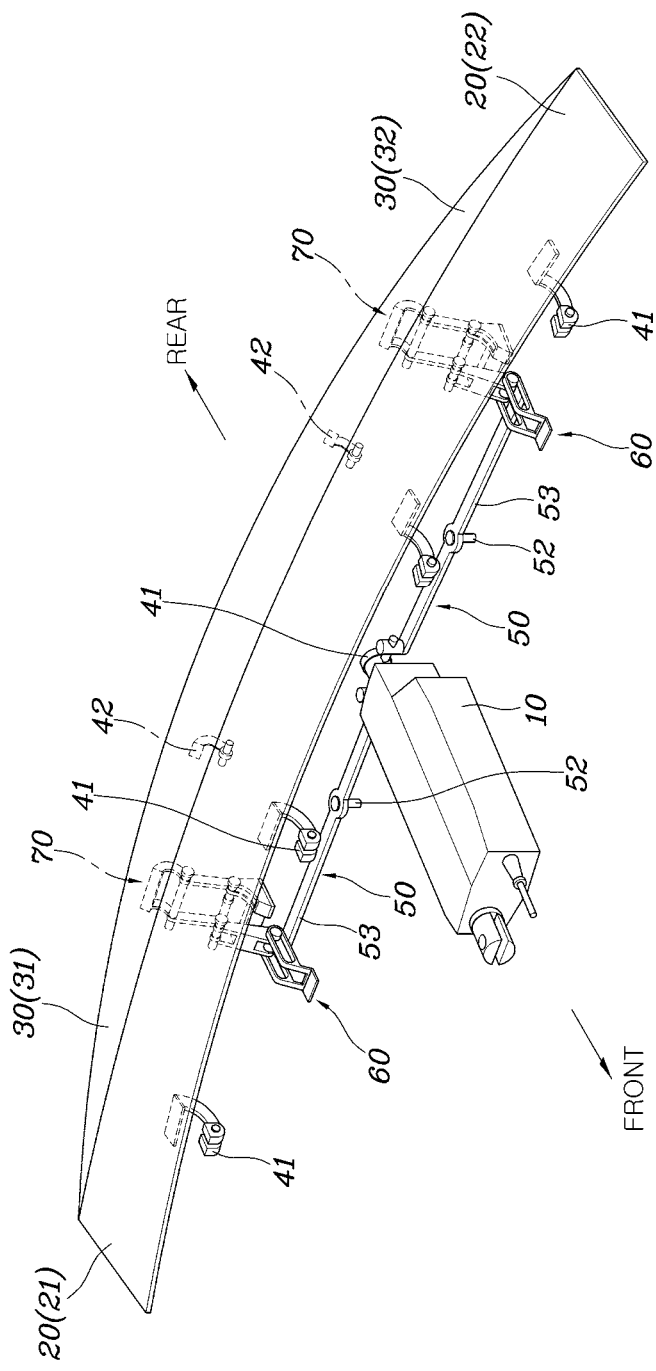
FIG. 4 is a perspective view showing a state with a trunk lid removed from FIG. 3.
Figure 5:
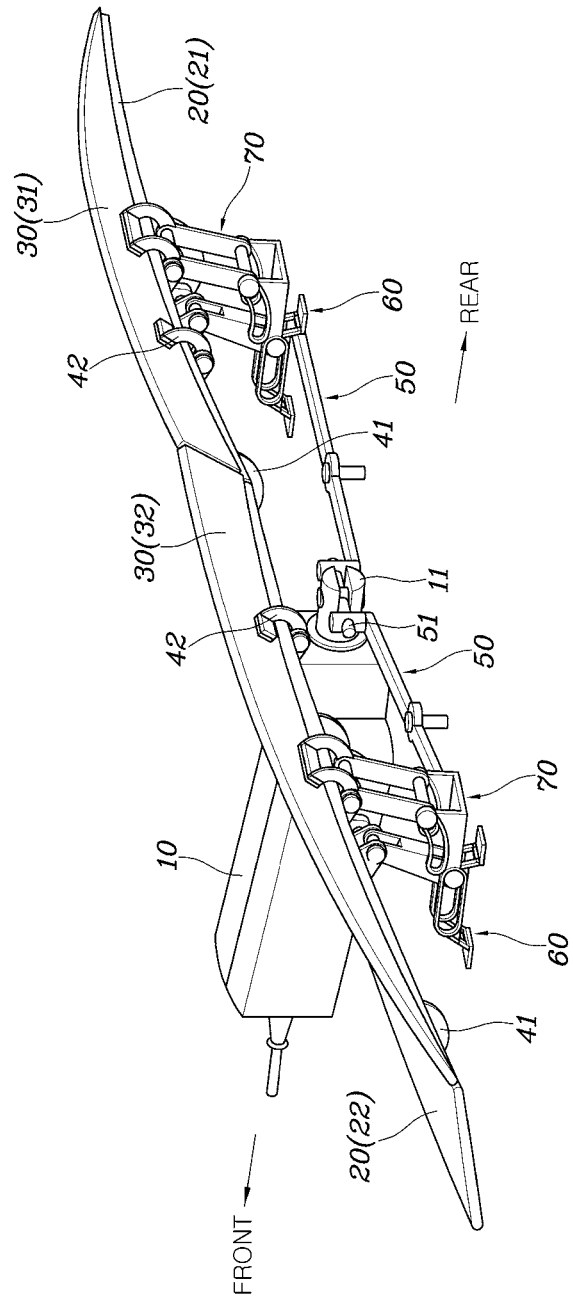
FIG. 5 is a perspective view of the state of FIG. 4 seen from the rear.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A rear spoiler apparatus for a vehicle according to exemplary embodiments of the present invention is described hereafter in detail with reference to the accompanying drawings.

The rear spoiler apparatus for a vehicle according to an exemplary embodiment of the present invention includes a main flap which is deployed to open by an operation force from an actuator and a support flap which is additionally deployed from the main flap to open. The support flap rotates when the main flap rotates and there is no specific power device (a motor, an actuator etc.) for operating the support flap.

Figure 8:
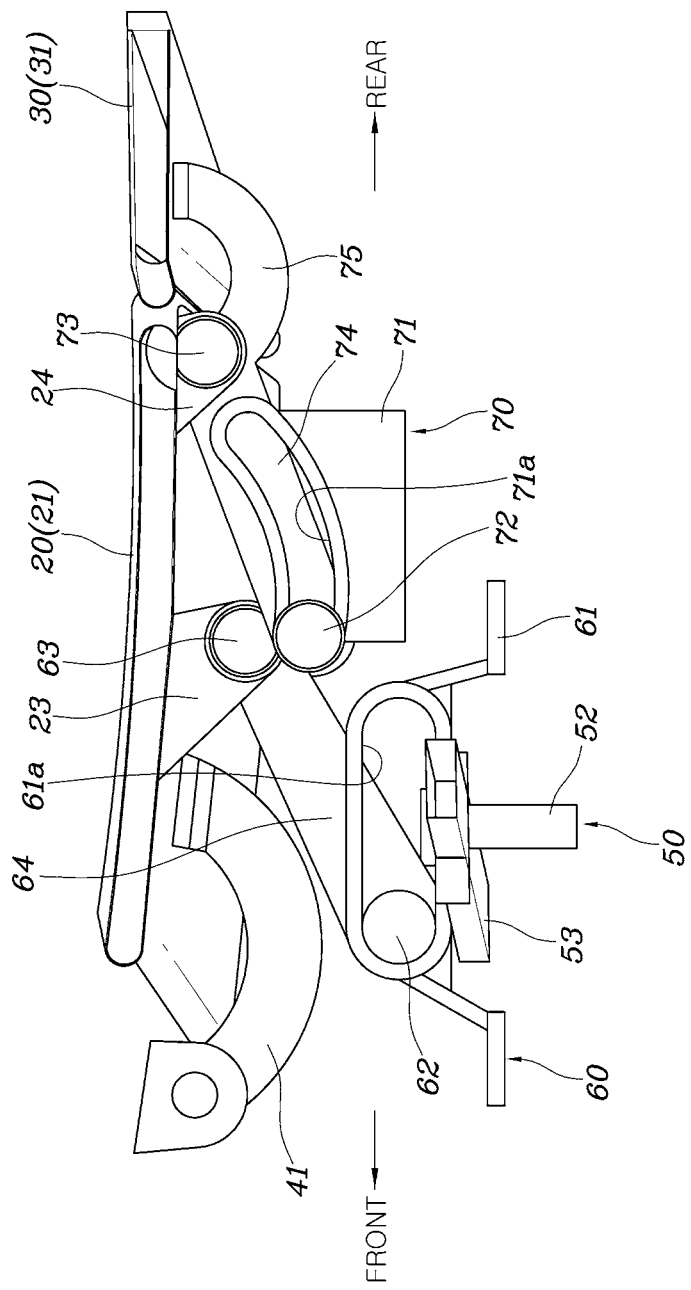
FIG. 8 is a side view of the main flap mechanism and the support flap mechanisms with the main flap and the support flap closed.

FIGS. 1 and 8 are views with a main flap and a support flap closed and FIG. 2, FIG. 3, FIG. 4, FIG. 5, FIG. 6, and FIG. 7 are views with the main flap and the support flap open.

A rear spoiler apparatus for a vehicle according to an exemplary embodiment of the present invention, as show in FIGS. 1 to 8, 10A and 10B, may include: an actuator 10 which is fixed to a trunk lid 1; a main flap 20 which is disposed such that a second end portion can rotate up and down about a first end portion hinged to the trunk lid 1, and is operated by power from the actuator 10; and a support flap 30 which is hinged to be configured to rotate about the main flap 20 and rotates up and down When the main flap 20 rotates.

The actuator 10 is fixed at a middle portion in the left and right direction of the trunk lid, the main flap 20 extends in the left and right direction of the trunk lid 1, and the support flap 30 is disposed behind the main flap 20.

The front end portion of the main flap 20 is rotatably coupled to the trunk lid 1 by a plurality of main hinges 41, so that the rear end portion of the main flap 20 rotates up and down about the main hinges 41 to open or close.

The front end portion of the support flap 30 disposed behind the main flap 20 is rotatably coupled to the main flap 20 by connecting hinges 42, so that the rear end portion of the support flap 30 rotates up and down about the connecting hinges 42 to open or close.

The apparatus of the present invention may further include link mechanisms 50 that are connected to the actuator 10, rotatably coupled to the trunk lid 1, and rotated by power from the actuator 10; main flap operation mechanisms 60 that connect the link mechanisms 50 and the main flap 20 to each other and rotates up and down the main flap 20 using torque from the link mechanisms 50; and support flap operation mechanisms 70 that are connected to the main flap 20, the support flap 30, and the trunk lid 1 to rotate up and down the support flap 30 using torque from the main flap 20.

According to an exemplary embodiment of the present invention, the main flap 20 and the support flap 30 each have a plurality of left and right partial sections with the actuator 10 therebetween, and when the actuator 10 is operated, the left and right sections of the main flap 20 and the support flap 30 are simultaneously operated.

That is, the main flap 20 includes a left flap 21 disposed at the left side of the actuator 30 and a right flap 22 disposed at the right side and the support flap 30 includes a left flap 31 disposed behind the left flap 21 and connected to the left flap 21 by the connecting hinge 42 and a right flap 32 disposed behind the right flap 22 and connected to the right flap 22 by the connecting hinge 42.

The link mechanisms 50 and the main flap operation mechanisms 60 are each separately disposed at the left and right sides of the actuator 30 to be respectively connected to the left flap 21 and the right flap 22 of the main flap 20, and the support flap operation mechanisms 70 are also separately disposed at the left and right sides to be respectively connected to the left flap 31 and the right flap 32 of the support flap 30.

However, the link mechanisms 50 and the main flap operation mechanism 60 each separately disposed at the left and right sides of the actuator 30 are all simultaneously operated when the actuator 30 is operated, so it is possible to remove an operation difference between the left flaps 21 and 31 and the right flaps 22 and 32.

The actuator 10 according to an exemplary embodiment of the present invention may be a solenoid having a plunger 11 reciprocating straight forward and rearward or a motor such as a linear motor.

The actuator 10 is controlled by a controller of a vehicle and the controller controls the operation of the actuator 10 on the basis of various items of information such as information related to a vehicle speed or a driving state, so it is possible to actively control the main flap 20 and the support flap 30.

The link mechanism 50 each include: a connecting rod 51 which is disposed through the left and right sides of an end portion of the plunger 11; and a rotation rod 53 that has one end portion connected to the connecting rod 51 and a second end portion connected to the main flap operation mechanism 60, has a rotation shaft 52 disposed between the first end portion and the second end portion and pivotally fixed to the trunk lid 1, and rotates about the rotation shaft 52 when the plunger 11 is moved forward and rearward thereof.

Figure 6:
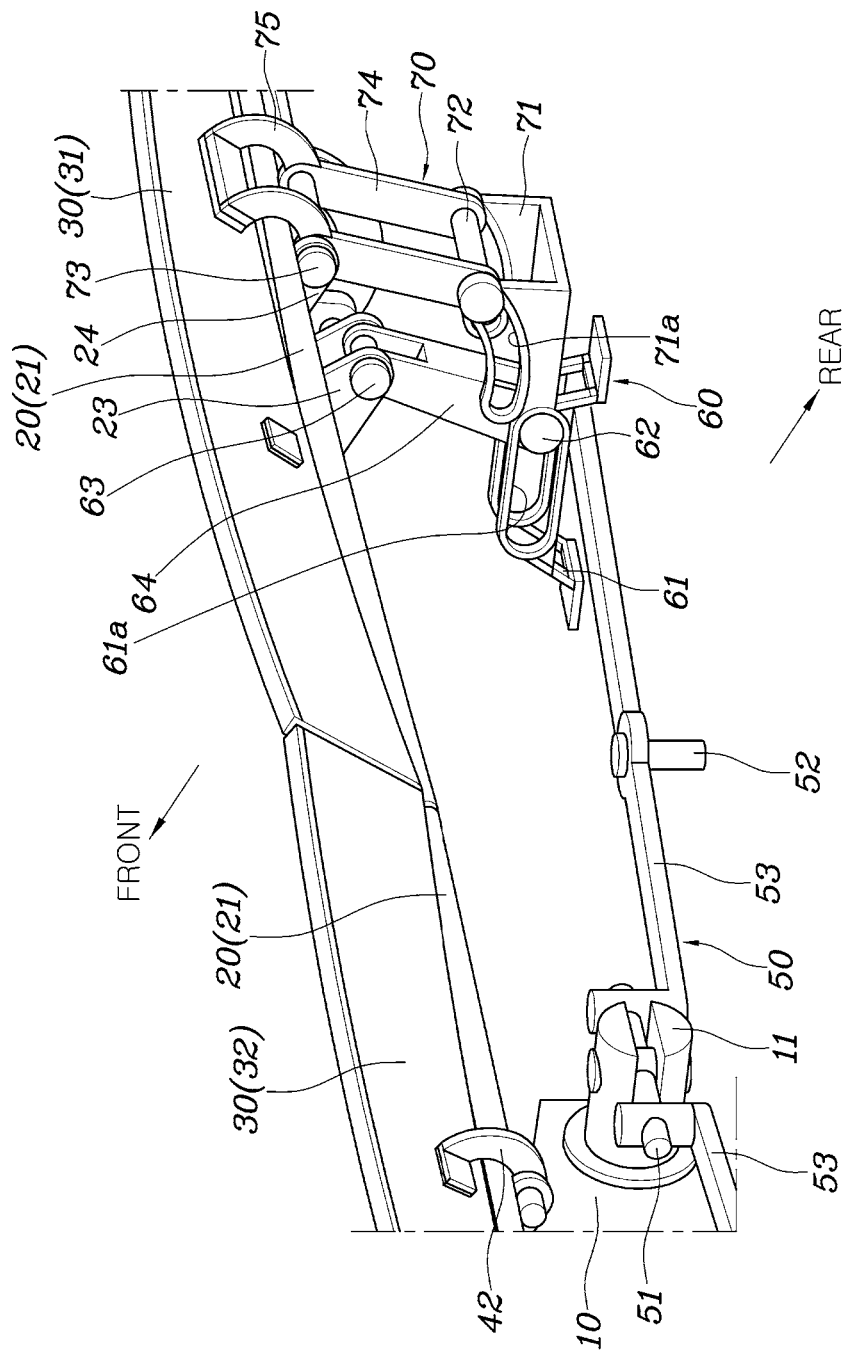
FIG. 6 is an enlarged view of the right portion of FIG. 5.
Figure 7:
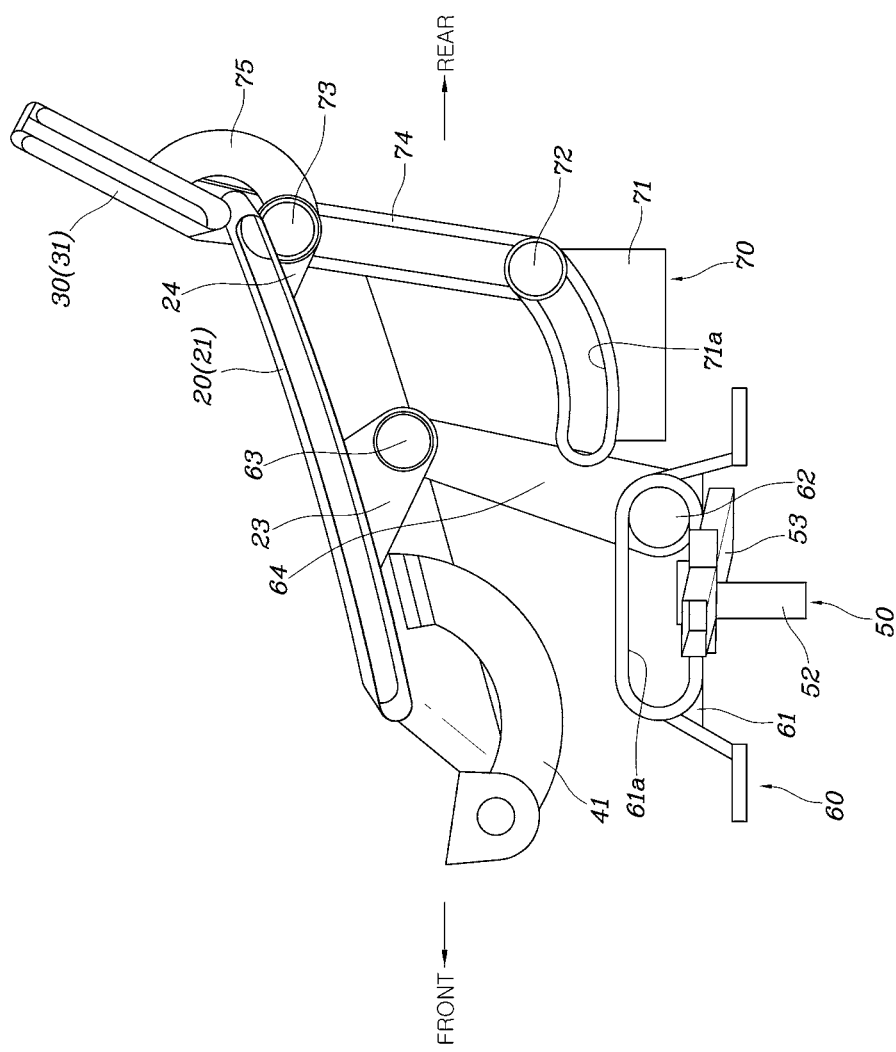
FIG. 7 is a side view of a main flap operation mechanisms and support flap operation mechanisms shown in FIG. 6.

In FIG. 6, the plunger 11 has moved maximally forward, and when the actuator 10 is operated and the plunger 11 is pushed rearward thereof, the rotary rods 53 rotate about the rotation shafts 52.

The main flap operation mechanisms 60 according to an exemplary embodiment of the present invention each include: a main guide bracket 61 which is fixed to the trunk lid 1 and has main guide holes 61a extending forward and rearward thereof; a main lower shaft 62 which is connected to an end portion of the rotation rod 53 and moves forward and rearward in the main guide holes 61a; a main upper shaft 63 which is rotatably coupled to a first flange 23 of the main flap 20; and a main rod 64 that connects the main lower shaft 62 and the main upper shaft 63 to each other.

The support flap operation mechanisms 70 each include: a support bracket 71 which is fixed to the trunk lid 1 and has support guide holes 71a extending forward and rearward thereof; a support lower shaft 72 which is disposed to move forward and rearward in the support guide holes 71a; a support upper shaft 73 which is rotatably coupled to a second flange 24 formed behind the first flange 23 on the main flap 20; a support rod 74 that connects the support lower shaft 72 and the support upper shaft 73 to each other; and an arc-shaped support hinge 75 that connects the support upper shaft 73 to the support flap 30.

The rear spoiler apparatus according to an exemplary embodiment of the present invention is characterized in that when the support flap 30 rotates with rotation of the main flap 20, the open angle A2 of the support flap 30 is greater than the open angle A1 of the main flap 20. Accordingly, it is possible to maximally reduce lift.

That is, when the open angle A2 of the support flap 30 is greater than the open angle A1 of the main flap 20 in the maximum operation state of the rear spoiler apparatus, it is possible to reduce lift more than when the open angle A1 of the main flap 20 and the open angle A2 of the support flap 30 are the same of the open angle A2 of the support flap 30 is smaller than the open angle A1 of the main flap 20, so it is possible to secure maximum driving stability.

To make the open angle A2 of the support flap 30 greater than the open angle A1 of the main flap 20 in an exemplary embodiment of the present invention, the main guide holes 61 are elongated horizontally forward and rearward thereof; whereas the support guide holes 71a are formed in an arc shape with the rear end portion higher than the front end portion and are positioned higher than the main guide holes 61a.

Figure 9:
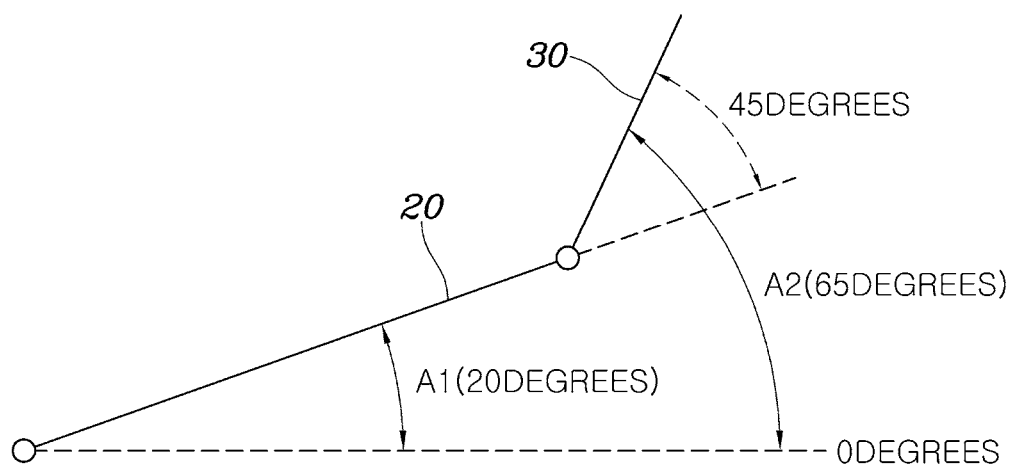
FIG. 9 is a schematic view showing the main flap and the support flap of the rear spoiler apparatus according to an exemplary embodiment of the present invention and FIG. 10A and FIG. 10B are schematic views showing an actuator.
Figure 10A:
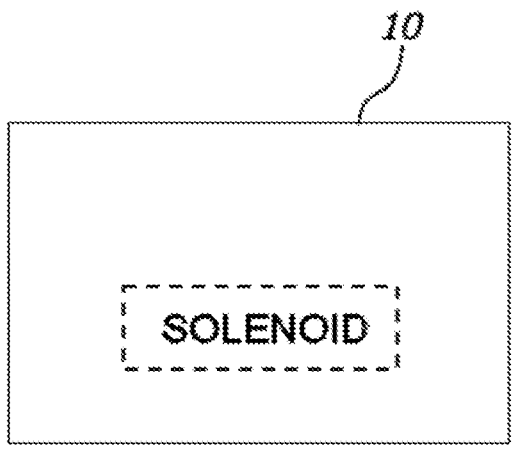
Figure 10B:
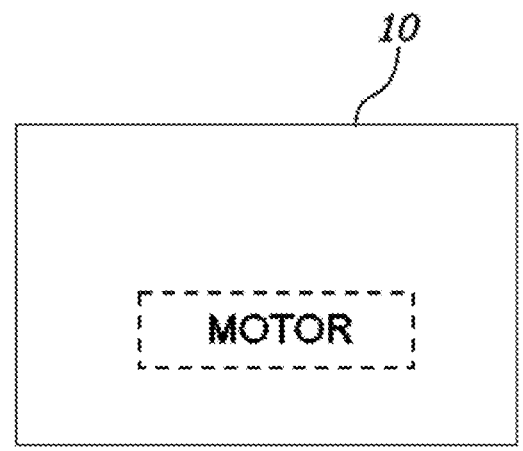

FIG. 9 is a schematic view showing the main flap 20 and the support flap 30 in the maximum operation state of the rear spoiler apparatus, that is, when the main flap 20 and the support flap 30 are maximally open.

When the main flap 20 and the support flap 30 are closed in close contact with the trunk lid 1, the open angle A1 of the main flap 20 and the open angle A2 of the support flap 30 are the same as 0 degree.

When the open angle A1 of the main flap 20 is 5 degrees, the open angle A2 of the support flap 30 is 15 degrees from the ground (that is, when A1 is 5 degrees, A2 is 10 degrees from A1).

When the open angle A1 of the main flap 20 is 10 degrees, the open angle A2 of the support flap 30 is 35 degrees from the ground (that is, when A1 is 10 degrees, A2 is 25 degrees from A1).

When the open angle A1 of the main flap 20 is 15 degrees, the open angle A2 of the support flap 30 is 50 degrees from the ground (that is, when A1 is 15 degrees, A2 is 35 degrees from A1).

When the main flap 20 is maximally opened and the open angle A1 is 20 degrees, the support flap 30 is also maximally opened and the open angle A2 is 65 degrees from the ground (that is, when A1 is 20 degrees, A2 is 45 degrees from A1).

The reason that the open angle A2 of the support flap 30 is greater than the open angle A1 of the main flap 20 when the rear spoiler apparatus is operated, as described above, depends on the shapes and positions of the main guide holes 61a and the support guide holes 71a, and accordingly, it is possible to maximally reduce lift.

The open angle A2 of the support flap 30 and the open angle A1 of the main flap 20 are set to provide an optimum aerodynamic effect through a wind tunnel test and may be changed in various ways, depending on the types of vehicles and the shapes and sizes of the main flap 20 and the support flap 30.

In FIG. 6, the main flap 20 and the support flap 30 are maximally open and the plunger 11 of the actuator 10 has been moved maximally forward thereof.

In the state shown in FIG. 6, when the actuator 10 is operated and the plunger 11 is pushed rearward thereof, the rotation rod 53 at the right side rotates counterclockwise about the rotation shaft 52, the main lower shaft 62 connected to the rotation rod 53 is moved forward in the main guide hole 61a, the main upper shaft 63 is moved rearward thereof, and the main rod 64 is inclined rearward thereof, so that the rear end portion of the main flap 20 is rotated downward. Accordingly, the open angle A1 of the main flap 20 is gradually reduced.

As the main flap 20 is rotated downward such that the open angle A1 decreases, from the state shown in FIG. 6, the support hinge 75 is rotated clockwise, the support rod 74 is inclined rearward and the support lower shaft 72 is moved forward in the support guide groove 71a, so that the rear end portion of the support flap 30 is rotated downward. Accordingly, the open angle A2 of the support flap 40 is also gradually reduced.

When the main flap 20 and the support flap 30 are rotated downward such that the open angles A1 and A2 decrease, consequently the open angles A1 and A2 of the main flap 20 and the support flap 30 become 0 degree, so that the flaps are converted into the closed state shown in FIGS. 1 and 8.

The operation of opening the main flap 20 and the support flap 30 progresses in the opposite order, which is not described herein.

According to an exemplary embodiment of the present invention, as described above, the rear spoiler apparatus for a vehicle includes the main flap 20 which is deployed by an operation force from the actuator 10 and the support flap 30 which is additionally deployed from the main flap 20, and the support flap 30 is rotated together to open when the main flap 20 is rotated. Therefore, the, there is no demand for a separate power device (a motor, an actuator etc.) for operating the support flap 30 in the apparatus of the present invention, so it is possible to reduce the manufacturing cost and weight and simplify the operation structure, so it is possible to make the apparatus compact.

Furthermore, since the rear spoiler apparatus according to an exemplary embodiment of the present invention is characterized in that when the support flap 30 rotates with rotation of the main flap 20, the open angle A2 of the support flap 30 is greater than the open angle A1 of the main flap 20. Accordingly, it is possible to maximally reduce lift as much as possible and secure maximum driving stability.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear spoiler apparatus for a vehicle, the rear spoiler apparatus comprising:
   an actuator fixed to a trunk lid;
   a main flap engaged to the actuator and including a first end portion hinged to the trunk lid and a second end portion, wherein the second end portion is rotatable up and down about the first end portion hinged to the trunk lid, wherein the main flap is operated by power from the actuator;
   a support flap hinged to be rotatable about the main flap, wherein the support flap is rotatable up and down in accordance with rotation of the main flap;
   link mechanisms connected to the actuator rotatably coupled to the trunk lid and the main flap, and selectively rotatable by the power from the actuator; and
   main flap operation mechanisms connecting the link mechanisms and the min flap to each other and selectively rotating up and down the main flap using a torque transmitted from the link mechanisms,
   wherein the actuator includes a solenoid having a plunger reciprocating forward and rearward thereof or a motor, and
   wherein the link mechanisms each include:
      a connecting rod pivotally connected to predetermined sides of an end portion of the plunger; and
      a rotation rod having;
         a first end portion connected to the connecting rod;
         a second end portion connected to the main flap operation mechanism; and
         a rotation shaft disposed between the first end portion and the second end portion and pivotally fixed to the trunk lid, and
   wherein the rotation rod rotates about the rotation shaft when the plunger is moved forward and rearward thereof.

2. The rear spoiler apparatus of claim 1, further including support flap operation mechanisms connected to the main flap, the support flap, and the trunk lid to selectively rotate up and down the support flap using a torque transmitted from the main flap.

3. The rear spoiler apparatus of claim 1, wherein the main flap operation mechanisms each include:
   a main guide bracket fixed to the trunk lid and having a main guide hole extending forward and rearward thereof;
   a main lower shaft connected to the second end portion of the rotation rod and slidably engaged in the main guide hole to move forward and rearward in the main guide hole;
   a main upper shaft rotatably coupled to a first flange of the main flap; and
   a main rod connecting the main lower shaft and the main upper shaft to each other.

4. The rear spoiler apparatus of claim 3, wherein the support flap operation mechanisms each include:
   a support bracket fixed to the trunk lid and having a support guide hole extending forward and rearward thereof;
   a support lower shaft slidably disposed in the support guide hole to move forward and rearward in the support guide hole;
   a support upper shaft rotatably coupled to a second flange formed behind the first flange on the main flap;
   a support rod connecting the support lower shaft and the support upper shaft to each other; and
   an arc-shaped support hinge connecting the support upper shaft to the support flap.

5. The rear spoiler apparatus of claim 4, wherein, when the support flap rotates with a rotation of the main flap, an open angle of the support flap is greater than an open angle of the main flap.

6. The rear spoiler apparatus of claim 4,
   wherein the main guide hole is elongated horizontally forward and rearward thereof, and
   wherein the support guide hole is formed in an arc shape with a rear end portion thereof higher than a front end portion thereof and is disposed higher than the main guide hole.

7. The rear spoiler apparatus of claim 1,
   wherein the main flap and the support flap each have a plurality of first and second partial sections with the actuator therebetween, and
   when the actuator is operated, the first and second partial sections of the main flap and the support flap are operated.

\* \* \* \* \*